US012442500B2

(12) United States Patent
Kelly et al.

(10) Patent No.: US 12,442,500 B2

(45) Date of Patent: Oct. 14, 2025

(54) FOG AND DANCING LIQUID LANTERN

(71) Applicant: LIGHTUPTOYS.COM, LLC, Sellersburg, IN (US)

(72) Inventors: Joshua C. Kelly, New Albany, IN (US); Christopher D. Kelly, New Albany, IN (US); Max Armendariz Lalama, Sellersburg, IN (US); Evan Thompson, Jeffersonville, IN (US)

(73) Assignee: LIGHTUPTOYS.COM, LLC, Sellersburg, IN (US)

( * ) Notice: Subject to any disclaimer, the term of this patent is extended or adjusted under 35 U.S.C. 154(b) by 0 days.

(21) Appl. No.: 18/897,624

(22) Filed: Sep. 26, 2024

(65) Prior Publication Data

US 2025/0102123 A1 Mar. 27, 2025

Related U.S. Application Data

(60) Provisional application No. 63/556,937, filed on Feb. 23, 2024, provisional application No. 63/585,802, filed on Sep. 27, 2023.

(51) Int. Cl.
*F21S 10/00* (2006.01)
*F21Y 115/10* (2016.01)

(52) U.S. Cl.
CPC ......... *F21S 10/002* (2013.01); *F21Y 2115/10* (2016.08)

(58) Field of Classification Search
CPC ..................................................... F21S 10/002
See application file for complete search history.

(56) References Cited

U.S. PATENT DOCUMENTS

| | | | | |
|---|---|---|---|---|
| 5,192,126 | A * | 3/1993 | Remeyer | F21V 19/04 362/186 |
| 7,617,624 | B1 * | 11/2009 | Chen | G09F 19/02 40/406 |
| 9,242,264 | B2 | 1/2016 | Lee | |
| 9,278,369 | B2 * | 3/2016 | Lee | H04R 1/028 |
| 9,475,080 | B2 * | 10/2016 | Lee | F21S 10/023 |

* cited by examiner

*Primary Examiner* — Mary Ellen Bowman

(74) *Attorney, Agent, or Firm* — Jessica C. Ronald; Scott R. Cox

(57) ABSTRACT

A fog and dancing liquid lantern which includes a chamber secured between a base and a lid. The lid contains an ultrasonic mister, which is directed into the chamber to create fog effect therein. A lower surface of the chamber contains several orifices. The base contains a dancing liquid assembly, which includes an enclosure containing a motorized impeller secured adjacent to a pump chamber. A nozzle is secured adjacent to the pump chamber and includes channels that correspond with and extend into the orifices. A speaker is secured within the base and the motorized impeller is programmed to increase and decrease speed in synchronization with a sound played through the speaker, thereby producing taller and short oil columns in the chamber. The lantern is activated manually or wirelessly and produces these features independently or simultaneously.

20 Claims, 11 Drawing Sheets

FOG AND DANCING LIQUID LANTERN

CROSS-REFERENCE TO RELATED APPLICATIONS

This application claims benefit of provisional application No. 63/585,802 filed on Sep. 27, 2023 and also claims the benefit of provisional application No. 63/556,937 filed on Feb. 23, 2024. All publications, patents and patent applications referred to herein are incorporated by reference in their entirety.

FIELD OF INVENTION

The present disclosure relates generally to a lantern. More particularly, a lantern which produces a fog effect and dancing liquid feature within a chamber of the lantern.

BACKGROUND OF THE INVENTION

Lanterns and lantern toys exist, but they are typically limited to providing illumination. Accordingly, known lanterns are not capable of capable of storing a liquid within the lantern as the liquid would damage the internal elements of the lantern, thereby destroying any capabilities of illumination. Therefore, these known lanterns are not capable of producing a fog effect utilizing water and an ultrasonic mister or a dancing liquid effect utilizing oil. Moreover, they are not capable of recirculating the liquid throughout the toy for repeated reuse and in a way that does not damage the internal components of the lantern. In addition, known devices are not capable of producing multiple features or effects simultaneously or independently of one another and/or in synchronization with a sound played from a speaker within the lantern.

What is needed is a lantern that not only produces light, but also provides a unique interactive experience for the user by creating different effects within the chamber of the lantern. Furthermore, what is needed is a lantern that is capable of storing and moving liquid therethrough and recirculating that liquid for reuse without leaking and/or causing damage to the internal components of the lantern.

SUMMARY OF THE INVENTION

A fog and dancing liquid lantern which includes a chamber secured between a base and a lid. The lid contains an ultrasonic mister, which is directed into the chamber and creates a fog effect within the chamber when activated. A lower surface of the chamber contains several orifices therein. The base contains a dancing liquid assembly, which includes an enclosure that contains the components necessary for creating the dancing liquid effect within the chamber. These components include a motorized impeller, a pump chamber and a nozzle which includes channels that extend into the orifices in the lower surface of the chamber. The number of channels corresponds with the number of orifices. The motorized impeller pumps oil through the pump chamber, the channels and from the orifices to appear as rising and falling columns in the chamber. A speaker is secured within the base and the motorized impeller is programmed to increase and decrease speed in synchronization with the intensity of the sound played through the speaker. The faster the motor spins, the higher the oil columns appear in the chamber. When the speed of the motor is reduced, the height of the columns is reduced. The lantern is activated manually and includes a receiver and transmitter for wireless activation.

DETAILED DESCRIPTION

Figure 8:
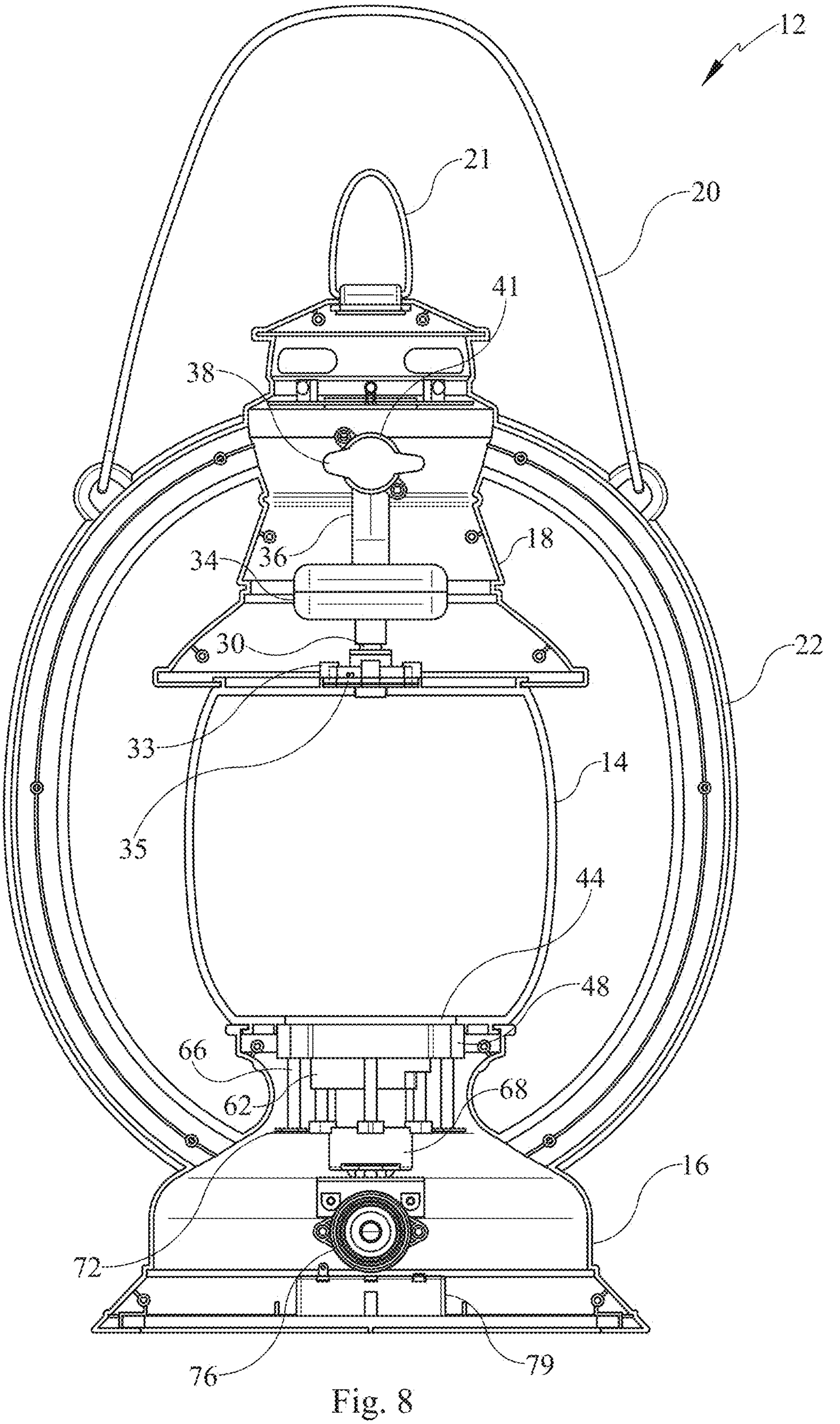
FIG. 8 shows a back open-faced view of the fog and dancing liquid lantern shown in FIG. 1.
Figure 9:
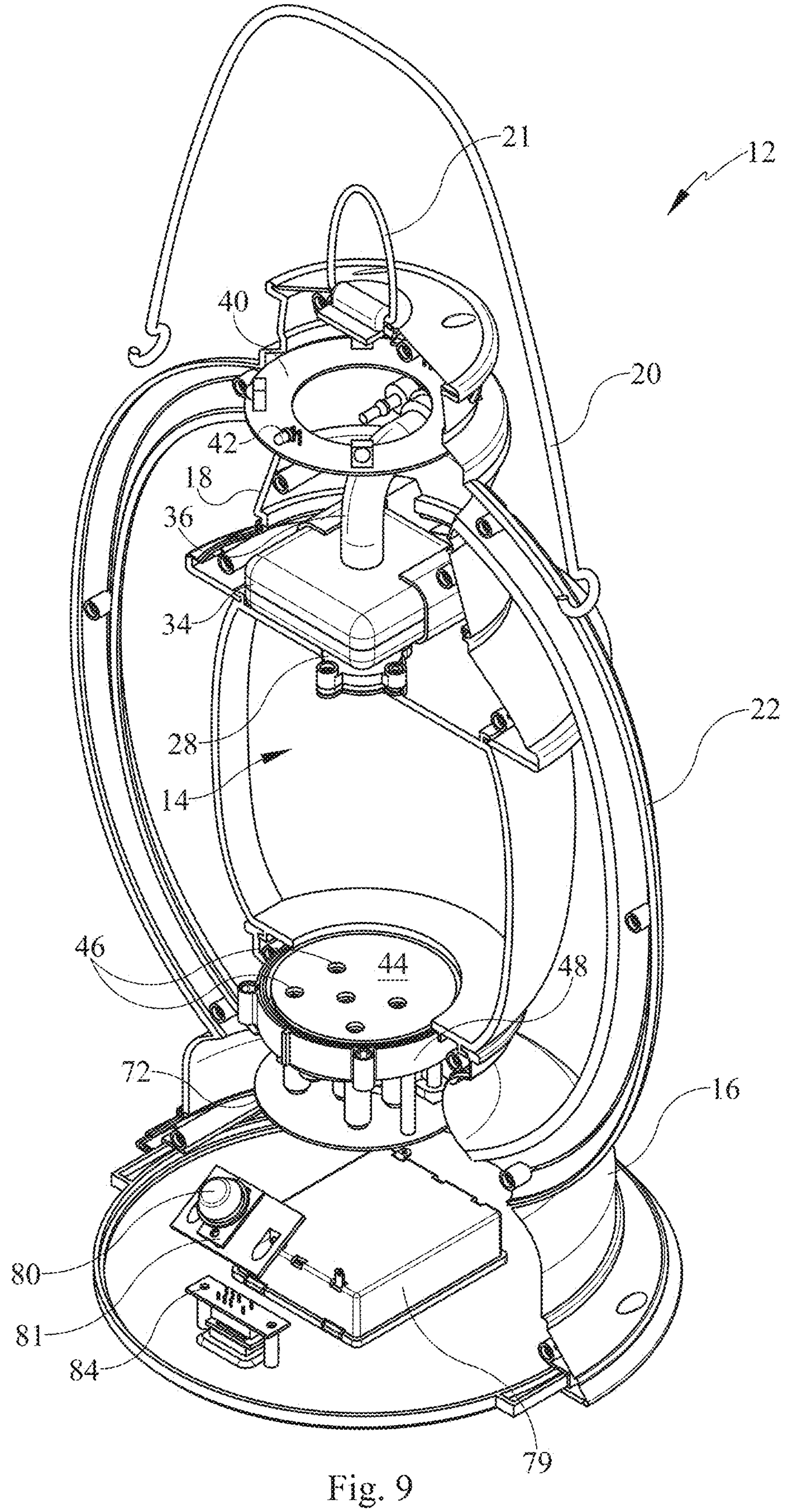
FIG. 9 shows a side, perspective open faced view of the fog and dancing liquid lantern shown in FIG. 1.
Figure 10:
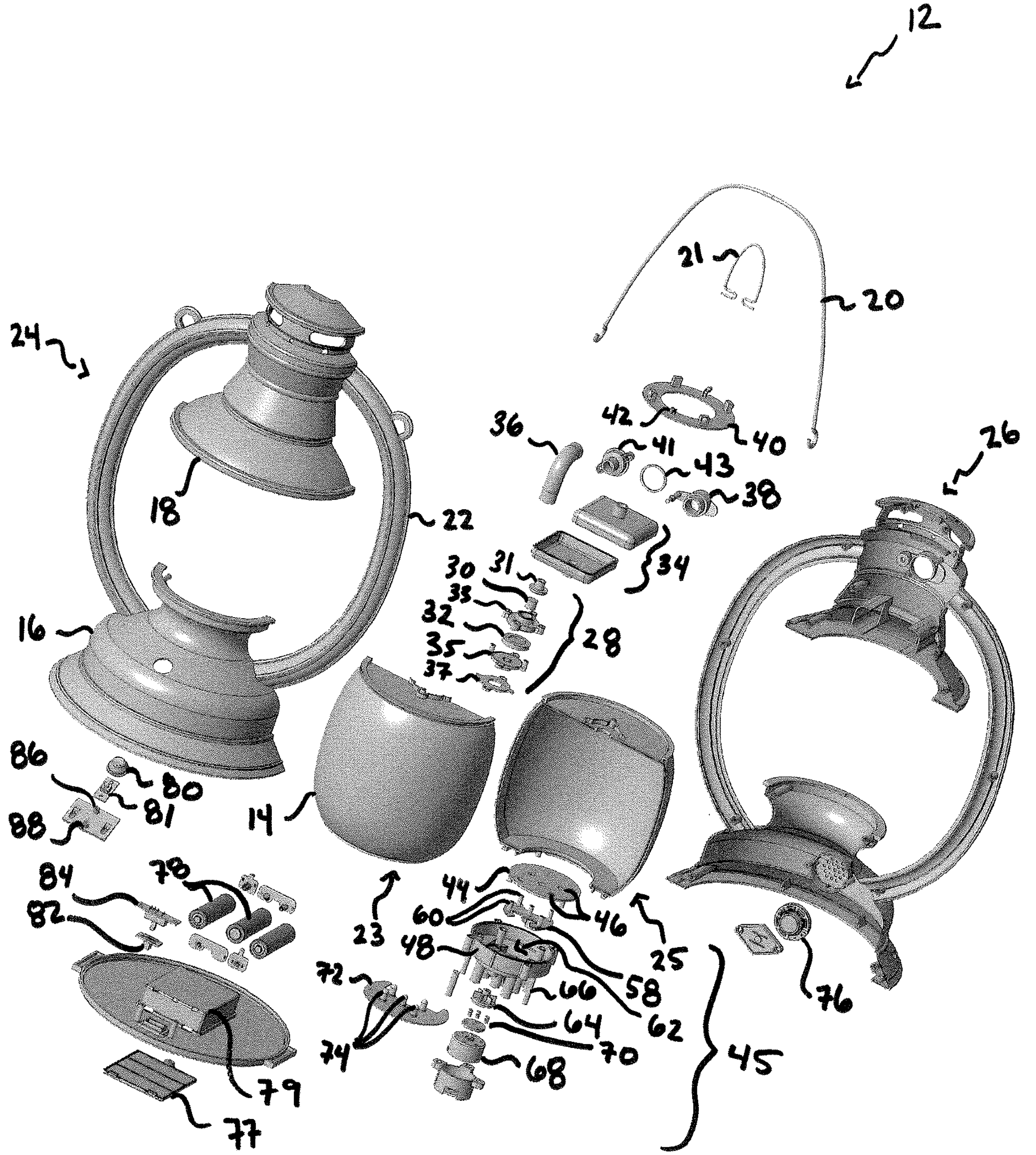
FIG. 10 shows an exploded view of the fog and dancing liquid lantern shown in FIG. 1.

FIGS. 1-10 show various views of a fog and dancing liquid lantern 12, which includes a chamber 14 secured between a base 16 and a lid 18. The lantern includes a handle 20 that is securable to a decorative handle 22, both of which are held by a user. Secured to the lid is a hook handle 21, from which the lantern hangs. As shown in FIG. 10, the lid, decorative handle and base are constructed of a front and back piece (24, 26), which are secured together around the chamber. Internal surfaces of the front and back pieces include several molded notches into which various components of the lantern are positioned when the front and back pieces are secured together. The chamber also includes a front and back segment (23, 25), which secure together to form the chamber, which is preferably made of a transparent material, through which the various effects of the lantern are visible, such as, light, fog, and dancing liquid.

As shown in FIGS. 7-10, the lid 18 includes an internal compartment, which houses a mister 28, preferably an ultrasonic mister. The mister is centrally situated in a bottom surface of the lid, so the mist disperses into the chamber 14 and appears as fog. As shown in FIG. 10, the ultrasonic mister secures in place within the lid via a mister fixing part 37, which secures the mister within the bottom surface of the lid. The ultrasonic mister includes a sponge 30 and a tablet 32, which vibrate together and generate mist from water that is transferred onto the sponge from a water reservoir 34 via a nozzle 31. The nozzle aids in not oversaturating the sponge. A user refills the water reservoir through a water feeding tube 36, which is secured into a back surface of the lid via a tube fixing part 41 and is sealed via a silicon plug 38. The fixing part and silicon plug are sealed together via a gasket 43, which prevents leakage of water into unwanted areas of the lantern 12. Accordingly, when the water requires replenishment, a user simply removes the silicon plug, which is easily accessible on the back of the lid and refills the water. The tablet is secured within a top and bottom tablet piece (33, 35). The sponge is secured adjacent to the tablet within the top tablet piece, so when fully saturated from the water transferred from the nozzle of the water reservoir, the tablet vibrates against the sponge at a specific rate, thereby breaking apart the water molecules. When the tablet vibrates against the sponge, the broken apart water molecules appear as mist or fog and disperse within the chamber. The fog fully permeates the chamber to produce a unique fog effect therein. Advantageously, a plate 44 located in a lower surface of the chamber includes a drain 75 located above the motorized impeller 64 into which the water from the mister drains for reuse within the dancing liquid effect. Further, in another embodiment, as the decorative handle 22 is hollow, it includes a recirculation channel into which the water from the mister is pumped back into the water reservoir for reuse.

As shown in FIGS. 7-10, further secured within the lid 18 is a first printed circuit board 40. While the water feeding tube 36 is sealed, to avoid any unnecessary leakage issues, the printed circuit board is preferably secured within an upper portion of the lid and above the water feeding tube. This printed circuit board includes at least one light emitting diode 42 ("LED") soldered thereto and is also preferably an infrared ("IR") printed circuit board, so that the fog effect is activated manually and/or wirelessly and/or remotely. This printed circuit board is electrically connected to the power supply 78 and other control circuitry within the base 16 via wiring that is secured within the decorative handle 22.

Figure 11:
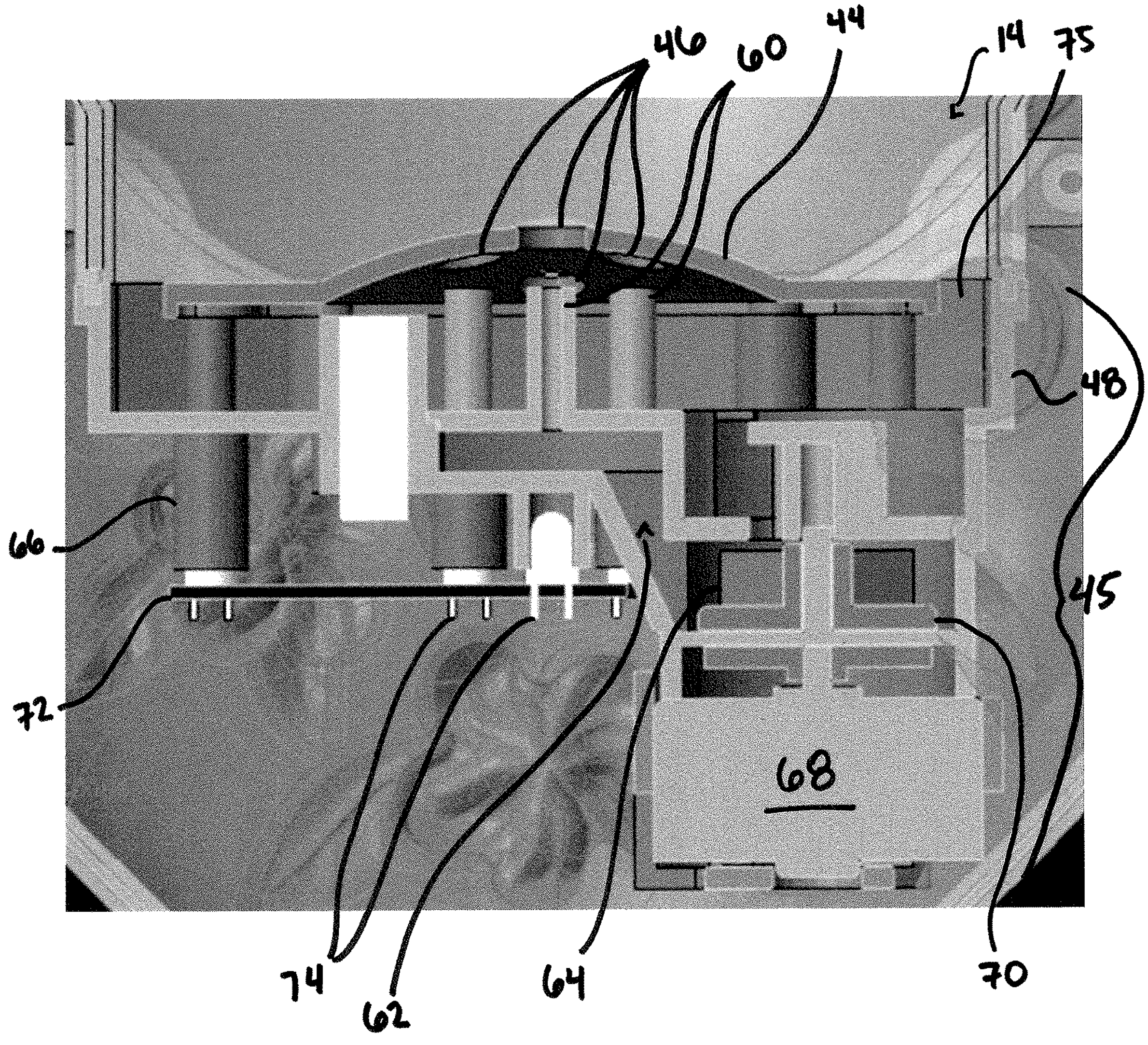
FIG. 11 shows an open-faced view of the dancing liquid assembly, which is secured within the base and includes an enclosure that contains the components responsible for creating the dancing liquid effect within the chamber of the fog and dancing liquid lantern shown in FIG. 1.

As shown in FIGS. 7-11, centrally affixed within a bottom surface of the chamber 14 is a plate 44, which contains various orifices 46. This plate serves as a cover for a dancing liquid assembly 45, which includes an enclosure 48 that is secured within the base 16 and contains the components necessary for producing the dancing liquid effect within the chamber. Secured within the enclosure and underneath the plate is a nozzle 58, which contains various channels 60, which extend upward into the orifices. The number of channels corresponds with the number of orifices. In this embodiment, there are five orifices and five corresponding channels. When the nozzle is secured within the enclosure, it forms a pump chamber 62, which is formed between the nozzle and a motorized impeller 64. The pump chamber is fixed and contains oil, which is projected through the channels and orifices to appear as columns. Oil, such as a paraffin oil, is preferred over water as it was surprisingly discovered that oil did not leave water marks or accumulate on the side of the chamber, which obstructed the effects within the chamber. Moreover, since the dancing liquid assembly is fixed within the lantern, it cannot easily be refilled. If water is used, it easily evaporated, especially in extreme heat and made the chamber cloudy. Use of oil rather than water solved the problems associated with these existing devices. The impeller is connected to a motor 68, such as a DC motor, which motor and impeller are magnetic and includes a coin magnet 70. The moving part of the enclosure is the motorized impeller. All other components are fixed, which overcomes problems associated with existing devices as there are fewer moveable parts, meaning there are less parts that are capable of breaking. As shown in FIGS. 7-11, secured to the enclosure is a second PCB 72, which includes LEDs 74 soldered thereto. As shown in FIGS. 10-11, the number of LEDs corresponds to the number of channels, so there are five LEDs, each of which are directed into a respective channel to shine light therethrough. Further secured to the printed circuit board and around the channels are supports 66, which aid in directing the light from each LED into the specific channel so that the light from the LED appears in the oil column projected from each channel. This advantageously also illuminates the oil columns in unique colors and patterns when they are rise and fall in the chamber, which creates a fountain feature. When the motor is activated, it rotates to accelerate the oil through the pump chamber, through the channels and out of the orifices. Advantageously the motor is programmed to accelerate and decelerate the flow of the oil at a rate that is timed with sound playing through a speaker 76 as the second PCB is electrically connected to the motor and to the speaker. The motor is programmed to change speed depending on the intensity of the sound to achieve a higher and lower fountain effect in the chamber. For example, when the music is louder or at a higher pace, the fountain effect mimics the intensity and is projected in higher columns in the chamber due to the accelerated speed at which the impeller is rotating. Advantageously, once the oil columns fall, the oil is recirculated back into the impeller through a drain 75, which is located adjacent to the impeller in the plate.

Figure 1:
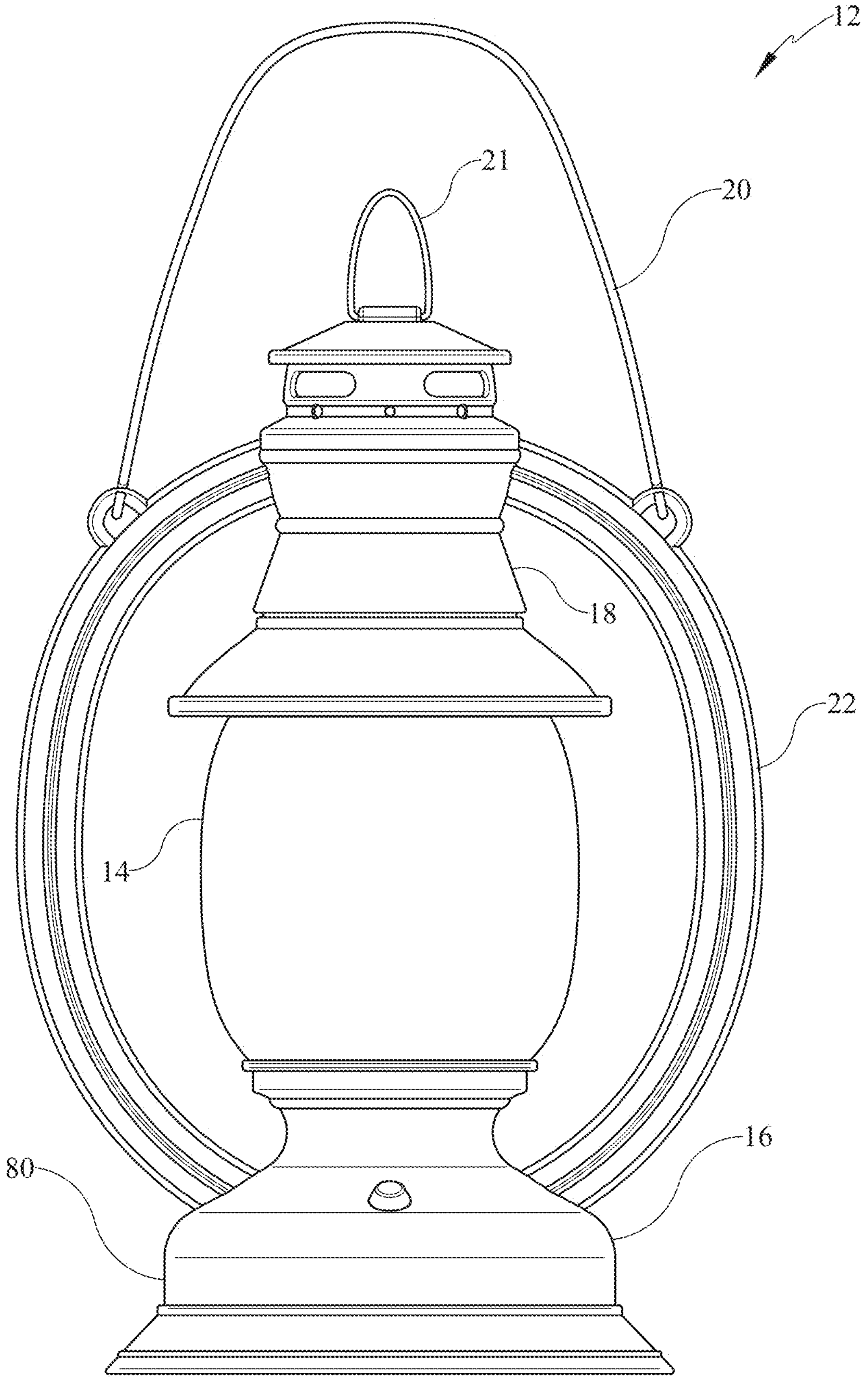
FIG. 1 shows a front view of a fog and dancing liquid lantern, which includes a chamber secured between a base and a lid.
Figure 2:
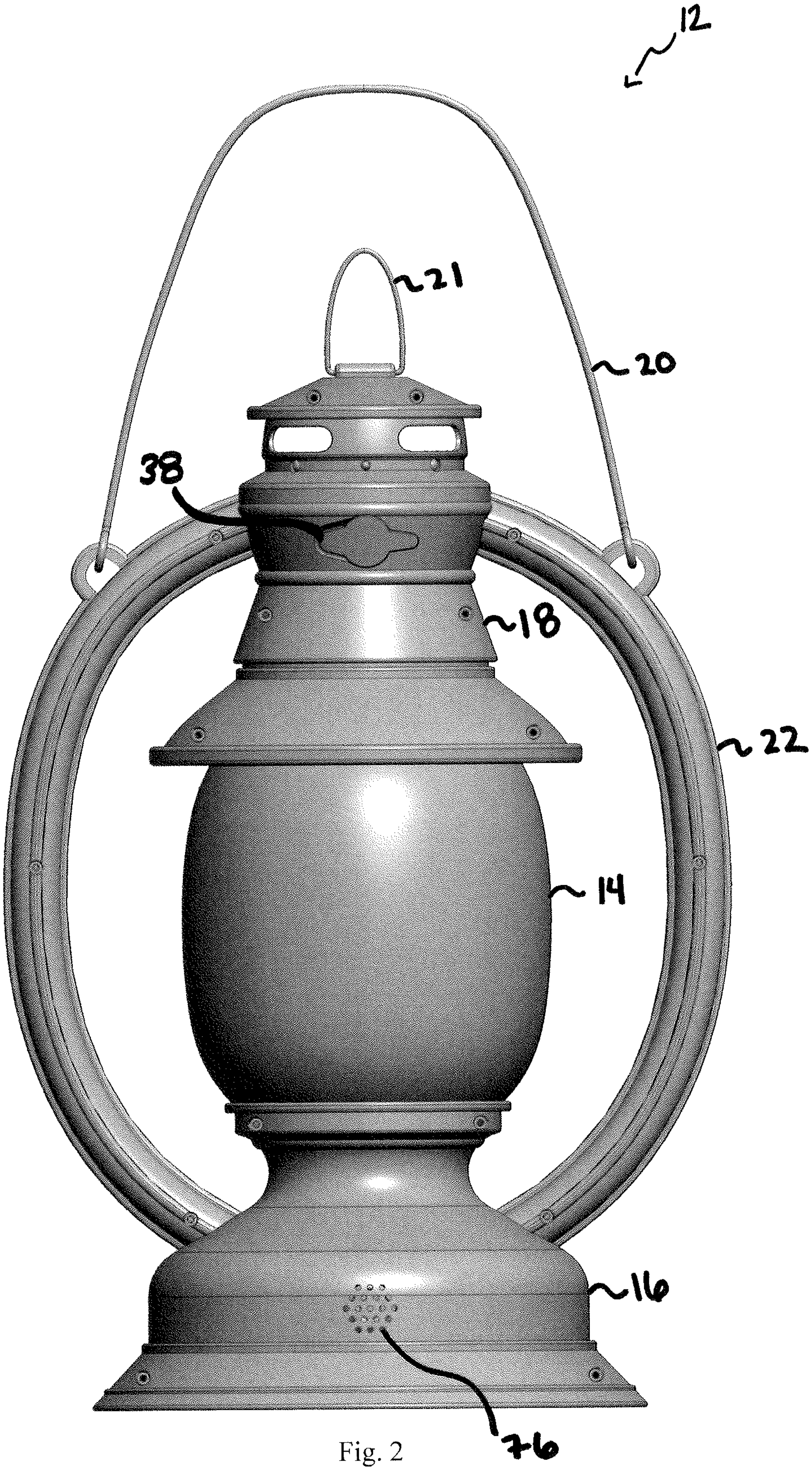
FIG. 2 shows a back view of the fog and dancing liquid lantern shown in FIG. 1.
Figure 3:
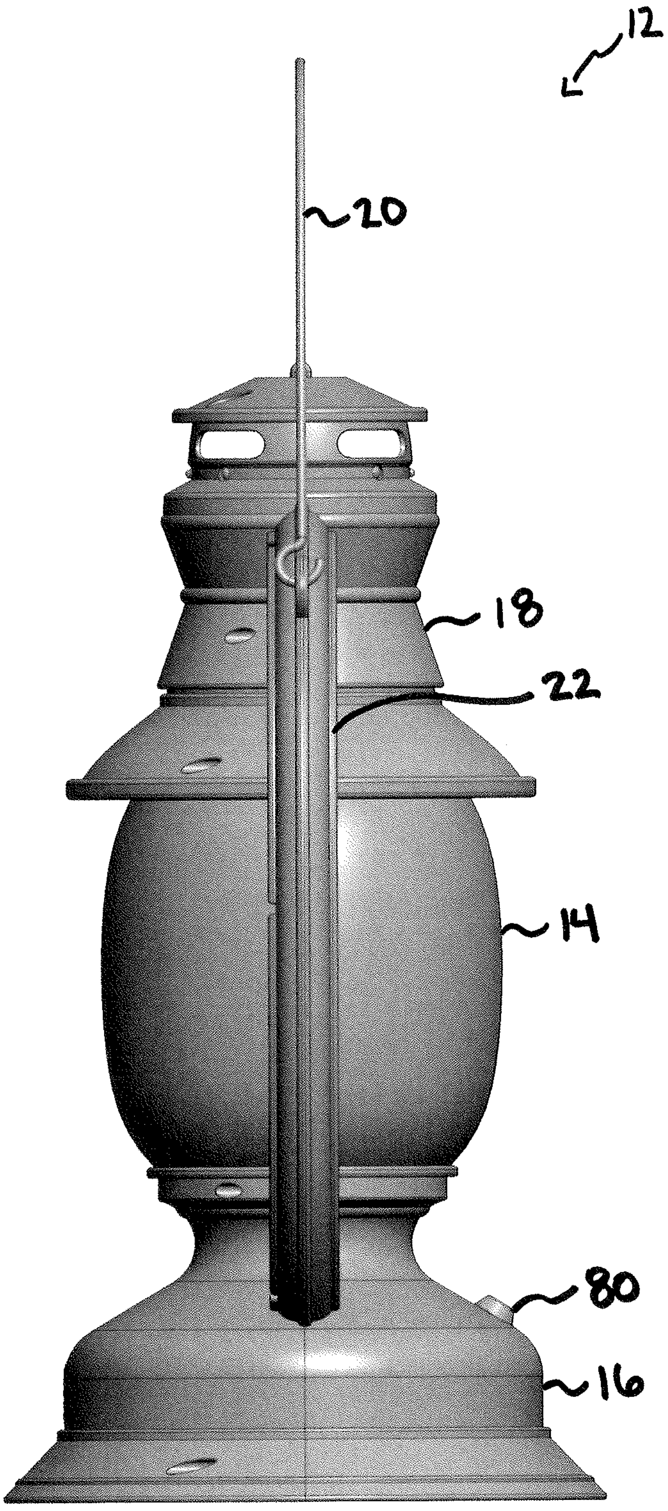
FIG. 3 shows a right-side view of the fog and dancing liquid lantern shown in FIG. 1.
Figure 4:
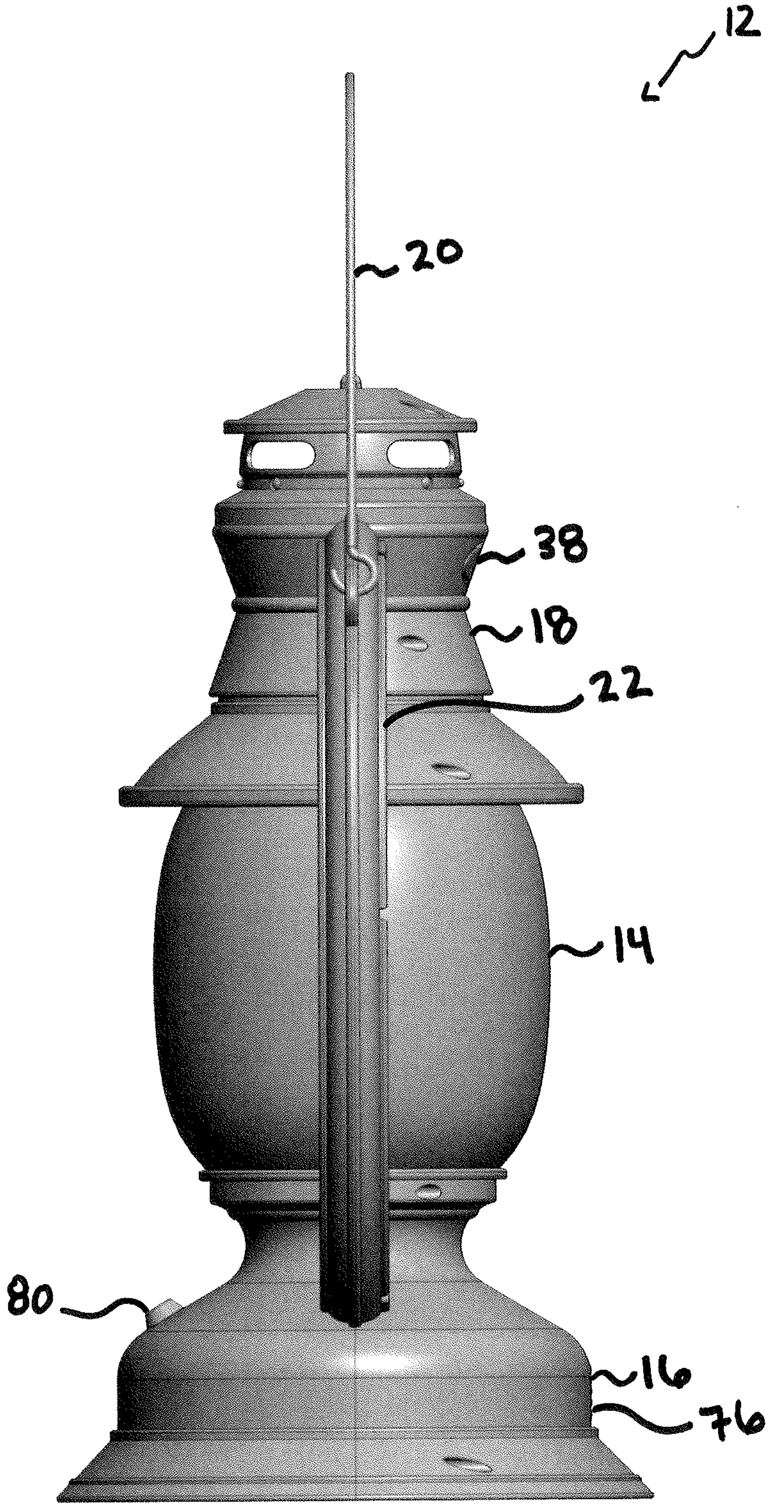
FIG. 4 shows a left-side view of the fog and dancing liquid lantern shown in FIG. 1.
Figure 5:
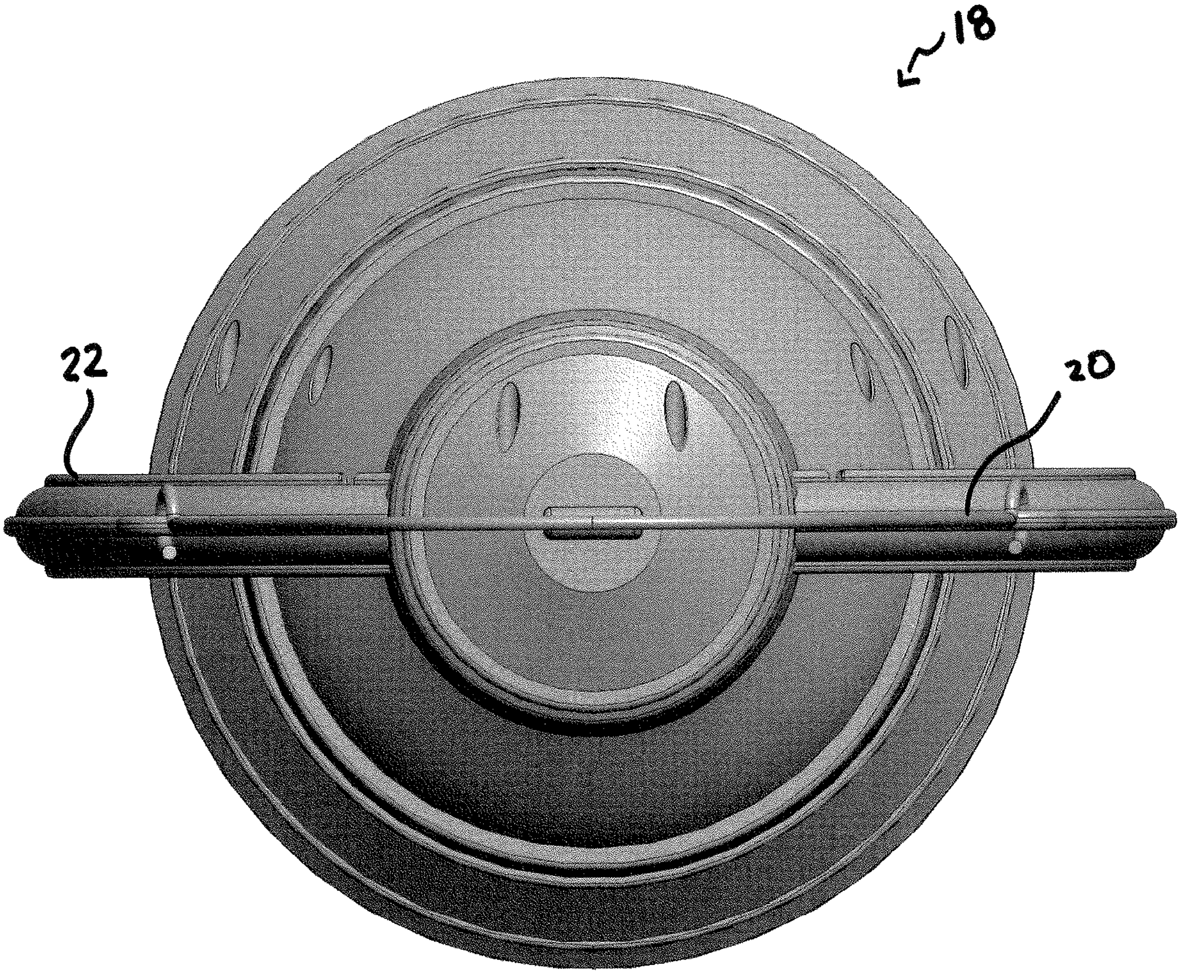
FIG. 5 shows a top view of the fog and dancing liquid lantern shown in FIG. 1.
Figure 6:
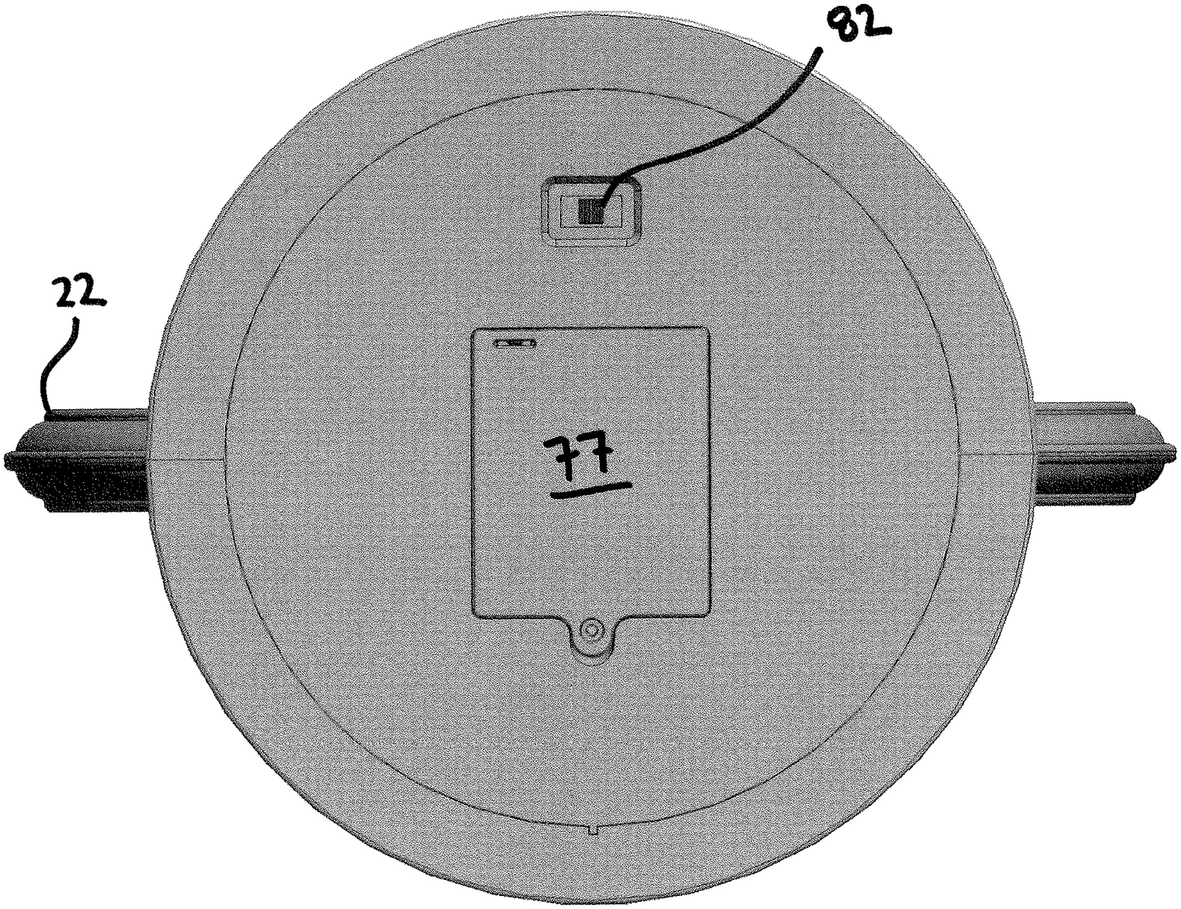
FIG. 6 shows a bottom view of the fog and dancing liquid lantern shown in FIG. 1.
Figure 7:
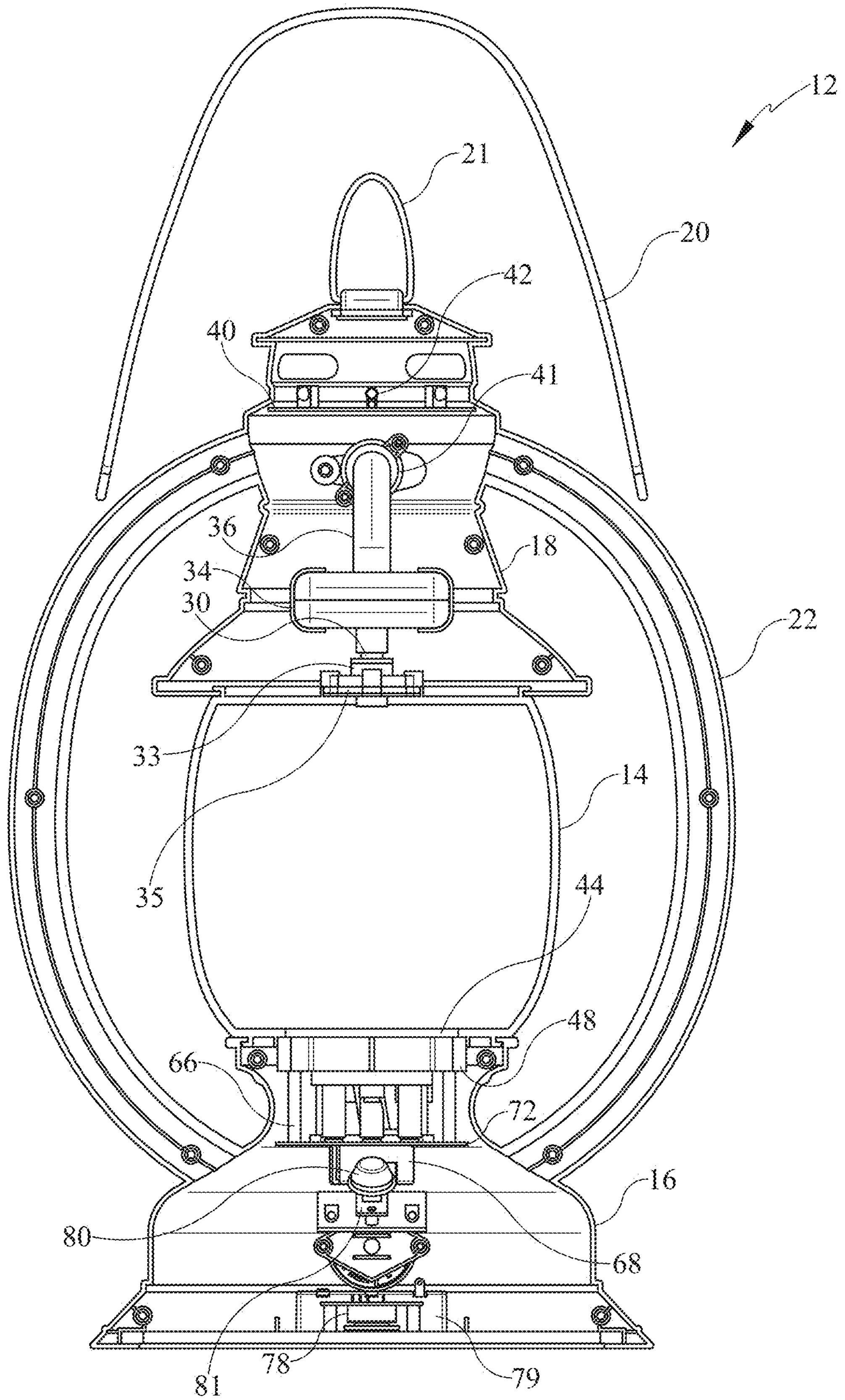
FIG. 7 shows a front open-faced view of the fog and dancing liquid lantern shown in FIG. 1.

As shown in FIGS. 10, the base further includes batteries 78, which are secured within a battery compartment 79 that is accessible via a cover 77 in a bottom surface of the lantern, see also FIGS. 7-9. These batteries are electrically connected to the first and second PCBs (40, 72) located in the lid 18 and the dancing liquid assembly 45. The lantern 12 is activated via a three-way switch 82 and a push button 80. The three way-switch is electrically connected to a three-way switch circuit board 84 and the push button is electrically connected to a push button printed circuit board 81. These circuit boards are programmed depending on user specification and control the various effects of the lantern, including but not limited to illumination, the fog effect, sound and the dancing liquid effect. Further, these circuit boards activate these effects independently or simultaneously in any sequence. They additionally activate these features manually or wirelessly. The position of the three-way switch controls the mode of the lantern, i.e., normal, off or interactive. The push button PCB is programmed to cycle through various programmed effects, depending on the number of times the user presses the button. In use, if the three-way switch is in the middle, all features of the lantern are off. If the slide switch is pushed to the left, the lantern enters normal mode for which it has been preprogrammed on the various control circuitry throughout the lantern. When the switch is initially pushed to the left, then a default light function is activated, wherein the LEDS located throughout the lantern in the lid and the base are activated. If a user presses the button once, a programmed dancing liquid feature is activated, so that oil is projected into the chamber 14 in columns to create a dancing liquid feature, which is programmed with sound playing through the speaker 76. If a user presses the button a second time, the ultrasonic mister 28 is activated, and the fog effect is produced in the chamber. If a user presses the button a third time, then both the fog and the dancing liquid features are activated simultaneously to create a unique viewer experience in the chamber that mimics weather patterns. If a user presses the button a fourth time, the lantern reverts to its default light function. When the slide switch is pushed to the right, then the lantern 12 enters an interactive mode. As shown in FIG. 10, the lantern is configured to both transmit and receive signals via a receiver 86 and a transmitter 88 which are secured within the base 16. When the user presses the button once, the default light effect is activated. When a user presses the button a second time, then an IR signal is transmitted to another device, for instance within an amusement park and the lantern receives a signal for its activation. When the lantern receives a signal, then a sound, liquid, fog and light effect is activated in any combination to provide a stunning feature within the chamber of the lantern.

It is well recognized by persons skilled in the art that alternative embodiments to those disclosed herein, which are foreseeable alternatives, are also covered by this disclosure. The foregoing disclosure is not intended to be construed to limit the embodiments or otherwise to exclude such other embodiments, adaptations, variations, modifications and equivalent arrangements.

The invention claimed is:

1. A dancing liquid lantern comprising:
  - a chamber with a first and second end, wherein the chamber contains orifices in a lower surface thereof;
  - a base secured to the first end of the chamber;
  - a lid secured to the second end of the chamber;
  - a motorized impeller secured within the base;
  - a pump chamber secured adjacent to the motorized impeller;
  - channels secured to the pump chamber, wherein the channels extend into the orifices in the lower surface of the chamber; and
  - a speaker secured within the base.

2. The dancing liquid lantern of claim 1, further comprising LEDs secured to a first printed circuit board within the lid.

3. The dancing liquid lantern of claim 1, further comprising LEDs secured to a second printed circuit board within the base, wherein the LEDs are directed into the channels.

4. The dancing liquid lantern of claim 1, further comprising a receiver and a transmitter secured within the base.

5. The dancing liquid lantern of claim 1, wherein the lower surface of the chamber further comprises a drain located adjacent to the motorized impeller.

6. The dancing liquid lantern of claim 1, wherein the motorized impeller increases and decreases speed in synchronization with a sound playing from the speaker.

7. The dancing liquid lantern of claim 1, wherein the chamber is made of a transparent material.

8. A fog and dancing liquid lantern comprising:
  - a base;
  - a chamber secured to the base and containing orifices in a lower surface thereof;
  - a lid secured to the chamber;
  - an ultrasonic mister secured within the lid;
  - a motorized impeller secured within the base;
  - a pump chamber secured adjacent to the motorized impeller;
  - channels secured to the pump chamber, wherein the channels extend into the orifices in the lower surface of the chamber; and
  - a speaker secured within the base.

9. The fog and dancing liquid lantern of claim 8, wherein the ultrasonic mister is directed into the chamber.

10. The fog and dancing liquid lantern of claim 8, further comprising LEDs secured to a first printed circuit board within the lid.

11. The fog and dancing liquid lantern of claim 8, further comprising LEDs secured to a second printed circuit board within the base, wherein the LEDs are directed into the channels.

12. The fog and dancing liquid lantern of claim 8, further comprising a receiver and a transmitter secured within the base.

13. The fog and dancing liquid lantern of claim 8, wherein the lower surface of the chamber further comprises a drain located adjacent to the motorized impeller.

14. The fog and dancing liquid lantern of claim 8, wherein the motorized impeller increases and decreases speed in synchronization with a sound playing from the speaker.

15. The fog and dancing liquid lantern of claim 8, further comprising a water reservoir secured within the lid and connected to the ultrasonic mister, wherein the reservoir is accessible through a surface of the lid.

16. A fog and dancing liquid lantern comprising:
  - a base;
  - a transparent chamber secured to the base and containing orifices in a lower surface thereof;
  - a lid secured to the chamber;
  - an ultrasonic mister secured within the lid;
  - a motorized impeller secured within the base;
  - a pump chamber secured adjacent to the motorized impeller;
  - channels secured to the pump chamber, wherein the channels extend into the orifices in the lower surface of the chamber;
  - a speaker secured within the base; and
  - a printed circuit board secured within the base and electrically connected to the speaker and the motorized impeller, wherein the motorized impeller increases and decreases speed in synchronization with a sound played from the speaker.

17. The fog and dancing liquid lantern of claim 16, further comprising LEDs secured to the printed circuit board, wherein the LEDs are directed into the channels.

18. The fog and dancing liquid lantern of claim 16, wherein the lower surface of the chamber further contains a drain located adjacent to the motorized impeller.

19. The fog and dancing liquid lantern of claim 16, further comprising a receiver and a transmitter secured within the base.

20. The fog and dancing liquid lantern of claim 17, wherein the ultrasonic mister, motorized impeller, LEDs and speaker are activated simultaneously.

* * * * *